US012620371B2

(12) United States Patent
Kimoto et al.

(10) Patent No.: US 12,620,371 B2
(45) Date of Patent: May 5, 2026

(54) INFORMATION PROCESSING APPARATUS

(71) Applicant: SHIMADZU CORPORATION, Kyoto (JP)

(72) Inventors: Yasuhiro Kimoto, Kyoto (JP); Yuri Ito, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 18/130,989

(22) Filed: Apr. 5, 2023

(65) Prior Publication Data

US 2023/0386428 A1 Nov. 30, 2023

(30) Foreign Application Priority Data

May 31, 2022 (JP) ................................ 2022-088323

(51) Int. Cl.
*G09G 5/37* (2006.01)

(52) U.S. Cl.
CPC ....... *G09G 5/37* (2013.01); *G09G 2340/0407* (2013.01); *G09G 2340/0464* (2013.01)

(58) Field of Classification Search
CPC ............ G09G 5/37; G09G 2340/0407; G09G 2340/0464; G09G 5/14; G09G 5/38; G01N 30/46; G01N 30/88; G01N 30/86; G01N 2035/0091; G01N 30/02; G06F 3/1423; G06F 3/1407; G06F 9/451
USPC ........................................................ 345/629
See application file for complete search history.

(56) References Cited

U.S. PATENT DOCUMENTS 9,601,090 B2 * 3/2017 Utsunomiya ............ G09G 5/37
2002/0182739 A1 * 12/2002 Sadik ................ G01N 33/0031 422/89
2013/0191782 A1 * 7/2013 Sugita .................. G06F 3/0482 715/810
2014/0078182 A1 * 3/2014 Utsunomiya ............ G09G 5/37 345/666

(Continued)

FOREIGN PATENT DOCUMENTS

JP 2014-75114 A 4/2014

OTHER PUBLICATIONS

Communication dated Dec. 9, 2025 in Japanese Application No. 2022-088323.

(Continued)

*Primary Examiner* — Sheree N Brown
(74) *Attorney, Agent, or Firm* — Sughrue Mion, PLLC

(57) ABSTRACT

An information processing apparatus capable of communicating with a plurality of chromatograph apparatuses includes a display unit, a display processing unit, and an operation receiving unit. The display processing unit causes the display unit to display a management screen in which a display image for each of the chromatograph apparatuses related to at least one of an analysis result in a plurality of the chromatograph apparatuses and operation on a plurality of the chromatograph apparatuses is arranged at a common aspect ratio. The operation receiving unit receives change operation for changing a display mode of the management screen. When the change operation is received by the operation receiving unit, the display processing unit rearranges the display image in a state where an aspect ratio is maintained.

7 Claims, 9 Drawing Sheets

(56) References Cited

U.S. PATENT DOCUMENTS

| | | | | |
|---|---|---|---|---|
| 2014/0195964 | A1* | 7/2014 | Park | G06F 3/0486 715/781 |
| 2015/0002548 | A1 | 1/2015 | Tsutsumitake | |
| 2019/0369069 | A1* | 12/2019 | Ota | G06F 3/14 |
| 2019/0369070 | A1* | 12/2019 | Terada | G01N 30/86 |
| 2020/0133339 | A1* | 4/2020 | Yildiz | G06F 1/1626 |
| 2023/0298498 | A1* | 9/2023 | Luo | G09G 3/035 345/659 |

OTHER PUBLICATIONS

Communication issued Aug. 1, 2025 in Chinese Application No. 202310474663.6.

* cited by examiner

INFORMATION PROCESSING APPARATUS

CROSS REFERENCE TO RELATED APPLICATIONS

This application claims priority to Japanese Patent Application No. 2022-088323 filed on May 31, 2022, the entire disclosure of which is incorporated by reference herein.

BACKGROUND OF THE INVENTION

Field of the Invention

The present invention relates to an information processing apparatus capable of communicating with a plurality of chromatograph apparatuses.

Description of the Related Art

For example, in a graph display processing apparatus as disclosed in JP-A-2014-75114, after rough alignment positions of a plurality of windows displayed on a display screen are designated by operation by the user, the windows can be aligned.

SUMMARY OF THE INVENTION

However, in such a graph display processing apparatus, an aspect ratio of windows changes as the windows are aligned. For this reason, for example, if a gradient, an interval between peaks, and the like in a graph of an analysis result change along with a change in an aspect ratio of a window, there is a possibility that the user visually recognizes the analysis result erroneously. That is, for each window, convenience is lowered when the aspect ratio changes.

The present invention has been made in view of the above circumstances, and an object of the present invention is to provide an information processing apparatus capable of arranging display images for a plurality of chromatograph apparatuses on a management screen at a common aspect ratio, and rearranging the display images in a state where the aspect ratio is maintained when a display mode of the management screen is changed.

An aspect of the present invention is an information processing apparatus that is capable of communicating with a plurality of chromatograph apparatuses, and includes a first display unit, a display processing unit, and an operation receiving unit. The display processing unit causes the first display unit to display a management screen in which a display image for each of the chromatograph apparatuses related to at least one of an analysis result in a plurality of the chromatograph apparatuses and operation on a plurality of the chromatograph apparatuses is arranged at a common aspect ratio. The operation receiving unit receives change operation for changing a display mode of the management screen. When the change operation is received by the operation receiving unit, the display processing unit causes the first display unit to display the management screen in which the display image is rearranged in a state where the aspect ratio is maintained.

According to the present invention, display images for a plurality of chromatograph apparatuses can be arranged on a management screen at a common aspect ratio, and the display images can be rearranged in a state where the aspect ratio is maintained when a display mode of the management screen is changed.

DETAILED DESCRIPTION OF THE PREFERRED EMBODIMENTS

1. Management System

Figure 1:
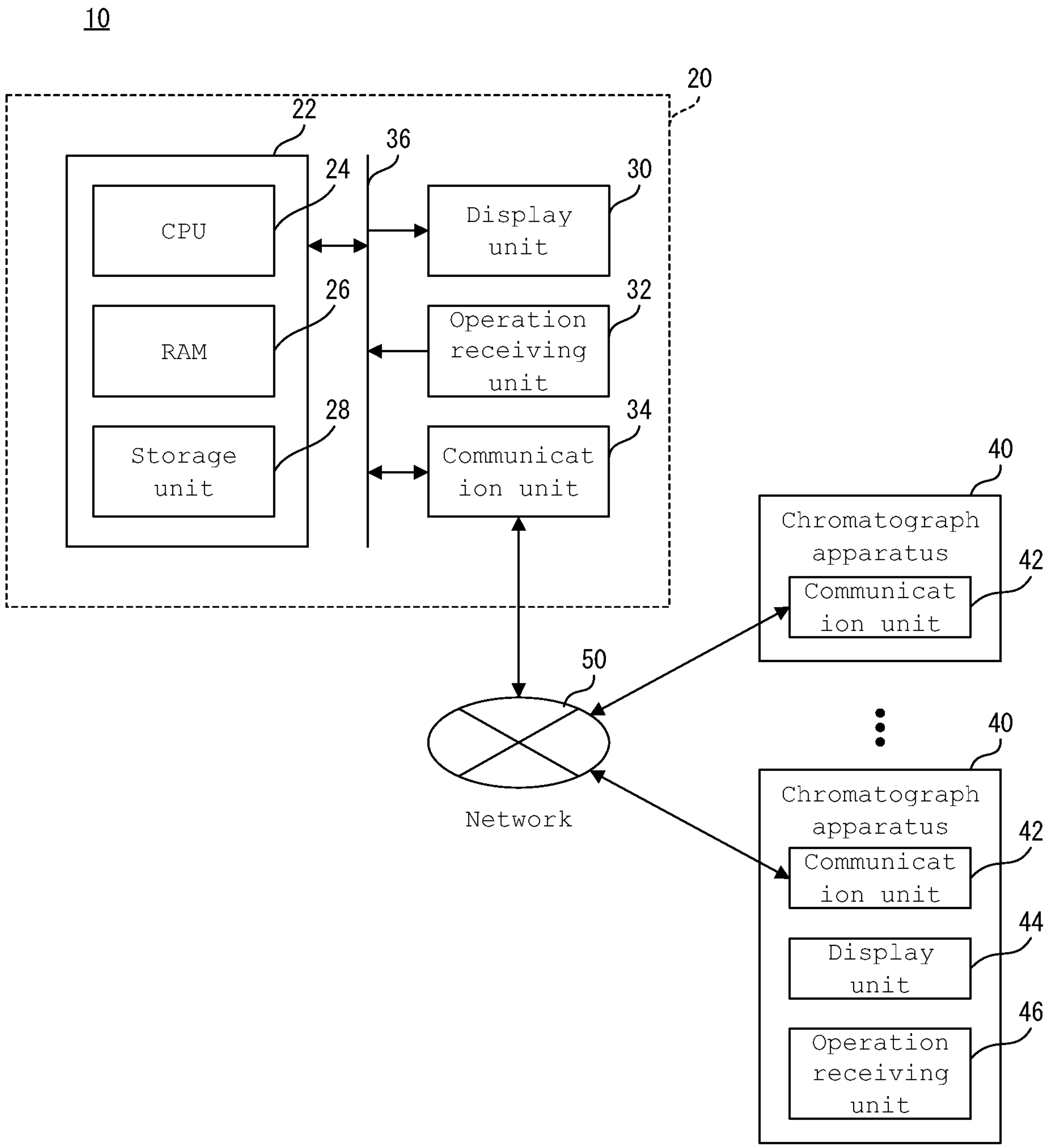
FIG. 1 is a block diagram illustrating an example of a management system according to the present embodiment.

FIG. 1 is a block diagram illustrating an example of a management system 10 according to the present embodiment. Further, FIG. 1 is also a block diagram illustrating an example of an electrical configuration of an information processing apparatus 20 of the present embodiment.

The management system 10 includes the information processing apparatus 20. The information processing apparatus 20 includes a control unit 22, a display unit 30, an operation receiving unit 32, a communication unit 34, and the like, which are electrically connected to each other via a circuit 36 such as a bus.

The control unit 22 is responsible for overall control of the information processing apparatus 20. The control unit 22 includes a central processing unit (CPU) 24. Further, the control unit 22 includes a random access memory (RAM) 26 and a storage unit 28 that can be directly accessed by the CPU 24.

The RAM 26 is used as a work area and a buffer area of the CPU 24. As the storage unit 28, a non-volatile memory such as a hard disc drive (HDD) or a solid state drive (SSD) is used.

The storage unit 28 stores a program (control program) for controlling operation of the information processing apparatus 20, data (execution data) required for executing the control program, and the like. Note that the storage unit 28 may be configured to include the RAM 26.

The display unit 30 is a device for displaying a screen. As the display unit 30, a general-purpose display such as a liquid crystal display (LCD) or an organic electro luminescence (EL) display can be used. Further, as the display unit 30, a device that projects an image, a screen, and the like on an object such as a projector may be used.

The operation receiving unit 32 receives optional operation. As the operation receiving unit 32, an input device such as a pointing device, a keyboard, a touch panel, or a hardware type button can be used. Further, as the operation receiving unit 32, a sensor can be used, and for example, an inertial sensor such as an acceleration sensor or a gyro sensor may be used. Note that, with the inertial sensor, it is possible to detect displacement such as rotation and inclination of the information processing apparatus 20 itself.

Further, in a case where a touch panel is used as the operation receiving unit 32 and a display is used as the display unit 30, the touch panel is provided on a display surface of the display. Further, in such a case, a touch panel display in which a display and a touch panel are integrally formed may be used.

The communication unit 34 includes a communication module, a communication circuit, or the like, and communicates with the outside in accordance with an instruction from the control unit 22.

In the present embodiment, a desktop personal computer (PC), a notebook (laptop) PC, a smartphone, a tablet terminal, a tablet PC, or the like can be used as the information processing apparatus 20.

The management system 10 includes a plurality of chromatograph apparatuses 40 in addition to the information processing apparatus 20. The chromatograph apparatus 40 is an apparatus that separates components contained in a sample for each component and detects various components as necessary. As the chromatograph apparatus 40, a liquid chromatograph apparatus, a gas chromatograph apparatus, or the like can be used.

The chromatograph apparatus 40 may include a communication unit 42 similar to the communication unit 34 and be configured to be able to communicate with the outside. Further, the chromatograph apparatus 40 may include a display unit 44 similar to the display unit 30. Furthermore, the chromatograph apparatus 40 may include an operation receiving unit 46 similar to the operation receiving unit 32.

In the management system 10 of the present embodiment, the information processing apparatus 20 is communicably connected to a plurality of the chromatograph apparatuses 40 via a network 50 such as a local area network (LAN), a wide area network (WAN), the Internet, or a mobile communication network.

Note that the information processing apparatus 20 may be directly connected to a plurality of the chromatograph apparatuses 40 in a wired or wireless manner. For this reason, the information processing apparatus 20 may be directly connected to a plurality of the chromatograph apparatuses 40 by short-range wireless communication such as infrared ray or Bluetooth (registered trademark). Further, a communication system for each of the chromatograph apparatuses 40 does not need to be the same.

According to the management system 10, the information processing apparatus 20 can communicate with a plurality of the chromatograph apparatuses 40, and can collectively manage a plurality of the chromatograph apparatuses 40.

2. Management Screen

Figure 2:
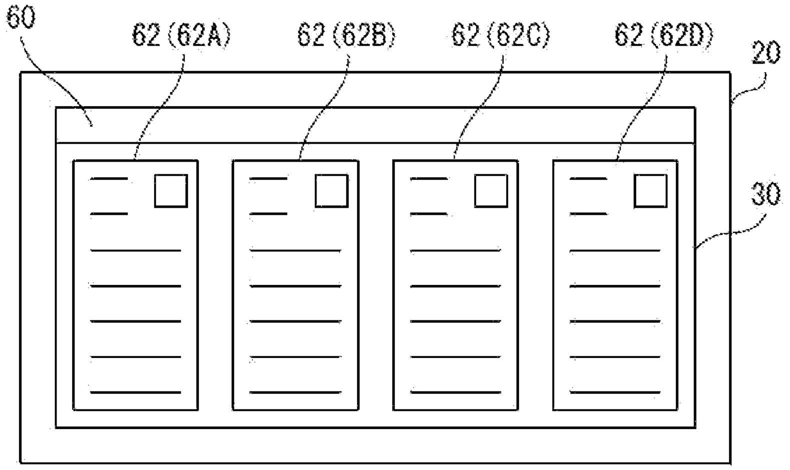
FIG. 2 is a diagram illustrating an example of a display mode of a management screen according to the present embodiment.

FIG. 2 is a diagram for explaining an example of a display mode of a management screen 60 of the present embodiment. Note that, in the example illustrated in FIG. 2, the information processing apparatus 20 is a portable device such as a tablet terminal.

In the present embodiment, a display image 62 is generated in each of the chromatograph apparatuses 40. Further, the display image 62 of each of the chromatograph apparatuses 40 has a common aspect ratio. Furthermore, the display image 62 of each of the chromatograph apparatuses 40 has the similar size. Note that sizes of the display images 62 of the chromatograph apparatuses 40 coincide with each other.

The display image 62 is an image related to at least one of an analysis result in the chromatograph apparatus 40 and operation on the chromatograph apparatus 40. The image related to an analysis result in the chromatograph apparatus 40 includes, for example, a chromatogram. The image related to operation on the chromatograph apparatus 40 includes, for example, a key operated when operation of the chromatograph apparatus 40 is started or stopped, a key operated when an operation condition of the chromatograph apparatus 40 is set, or the like. Note that the display image 62 may include an image other than these images.

The display image 62 generated by the chromatograph apparatus 40 is input to the information processing apparatus 20. The display image 62 may be generated on the information processing apparatus 20 side. In this case, information necessary for generating the display image 62 is input from the chromatograph apparatus 40 to the information processing apparatus 20.

In the information processing apparatus 20, when a predetermined application is executed, the management screen 60 is displayed on the display unit 30. Note that a method of displaying the management screen 60 on the display unit 30 is not particularly limited. For example, the management screen 60 may be displayed on the display unit 30 at a timing when the information processing apparatus 20 can communicate with at least one of the chromatograph apparatuses 40.

In the present embodiment, the display image 62 for each of the chromatograph apparatuses 40 is arranged on the management screen 60 at a common aspect ratio.

Therefore, in the present embodiment, as illustrated in FIG. 2, the display images 62 (display images 62A to 62D) for each of the chromatograph apparatuses 40 relating to at least one of an analysis result in a plurality of the chromatograph apparatuses 40 and operation on a plurality of the chromatograph apparatuses 40 are arranged on the management screen 60 at a common aspect ratio, and the management screen 60 is displayed on the display unit 30. The display images 62A to 62D in FIG. 2 are the display images 62 input from different ones of the chromatograph apparatuses 40 to the information processing apparatus 20, and have a common aspect ratio.

Each of the display images 62A to 62D functions as an interface of each of the chromatograph apparatuses 40. Therefore, each of the display images 62A to 62D can also be considered as a screen related to at least one of an analysis result in each of the chromatograph apparatuses 40 corresponding to each of the display images 62A to 62D and operation on each of the chromatograph apparatuses 40. For example, when operation is performed on an optional one of the display images 62, various types of processing are executed in the chromatograph apparatus 40 corresponding to the display image 62.

3. Change of Display Mode of Management Screen

The information processing apparatus 20 of the present embodiment has a function of preventing an aspect ratio of the display image 62 from being changed in a case where operation (change operation) for changing a display mode of the management screen 60 is received by the operation receiving unit 32.

For example, in a case where an apparatus having a function of detecting rotation of a device, such as a tablet terminal, itself is used as the information processing apparatus 20, operation (rotation operation) of rotating the information processing apparatus 20 itself is received by the operation receiving unit 32.

In such a case, in order to prevent the display image 62 from being displayed in an inclined state, the management screen 60 rotates in a direction opposite to a rotation direction of the information processing apparatus 20. By the above, a display mode of the management screen 60 is changed such that a vertical direction of the management screen 60 coincides with a perpendicular direction. Therefore, rotation operation is included in the change operation.

When the management screen 60 is rotated, size of the management screen 60 may be changed to size along the display unit 30. In such a case, in a conventional information processing apparatus, an aspect ratio of the management screen 60 is changed as size of the management screen 60 is changed.

In a conventional information processing apparatus, the display image 62 is displayed as large as possible on the management screen 60. For this reason, there has been a problem that, when an aspect ratio of the management screen 60 is changed, an aspect ratio of the display image 62 is also changed.

Further, for example, in a case where an apparatus having a function of optionally adjusting size of the management screen 60 such as a desktop PC is used as the information processing apparatus 20, operation (size change operation) of changing size of the management screen 60 is received by the operation receiving unit 32. Note that the size change operation means operation of changing at least one of a vertical width and a horizontal width of the management screen 60, and may be operation of changing one of a vertical width and a horizontal width of the management screen 60, or may be operation of simultaneously changing a vertical width and a horizontal width of the management screen 60.

The size change operation is operation for changing size of a screen conventionally performed in a tablet terminal, a desktop PC, or the like. When operation of changing size of the management screen 60 is performed, at least one of a vertical width and a horizontal width of the management screen 60 is changed, and a display mode of the management screen 60 is changed. Therefore, the size change operation is included in the change operation.

The size change operation is, for example, operation of directly changing size of the management screen 60. The operation of directly changing size of the management screen 60 includes drag operation on a frame of the management screen 60, pinch-in operation on the management screen 60, pinch-out operation on the management screen 60, and the like.

Note that the rotation operation is operation of indirectly changing size of the management screen 60. For this reason, the rotation operation can be considered to be included in the size change operation.

In a case where the size change operation is performed in a conventional information processing apparatus, an aspect ratio of the management screen 60 may be changed as size of the management screen 60 is changed. There has been a problem that, if an aspect ratio of the management screen 60 is changed, an aspect ratio of the display image 62 is also changed as described above.

As described above, if an aspect ratio of the display image 62 is changed every time the change operation (the rotation operation or the size change operation) is performed, it is inconvenient to manage a plurality of the chromatograph apparatuses 40.

For example, when an aspect ratio of the display image 62 corresponding to an analysis result is changed, a gradient in a graph and an interval between peaks change, and the user may recognize the analysis result erroneously.

Further, for example, when an aspect ratio of the display image 62 is changed, operational feeling for the display image 62 is also changed.

In view of the above, in the present embodiment, when the change operation is received by the operation receiving unit 32, the management screen 60 in which the display image 62 is rearranged in a state where an aspect ratio is maintained is displayed on the display unit 30.

Figure 3:
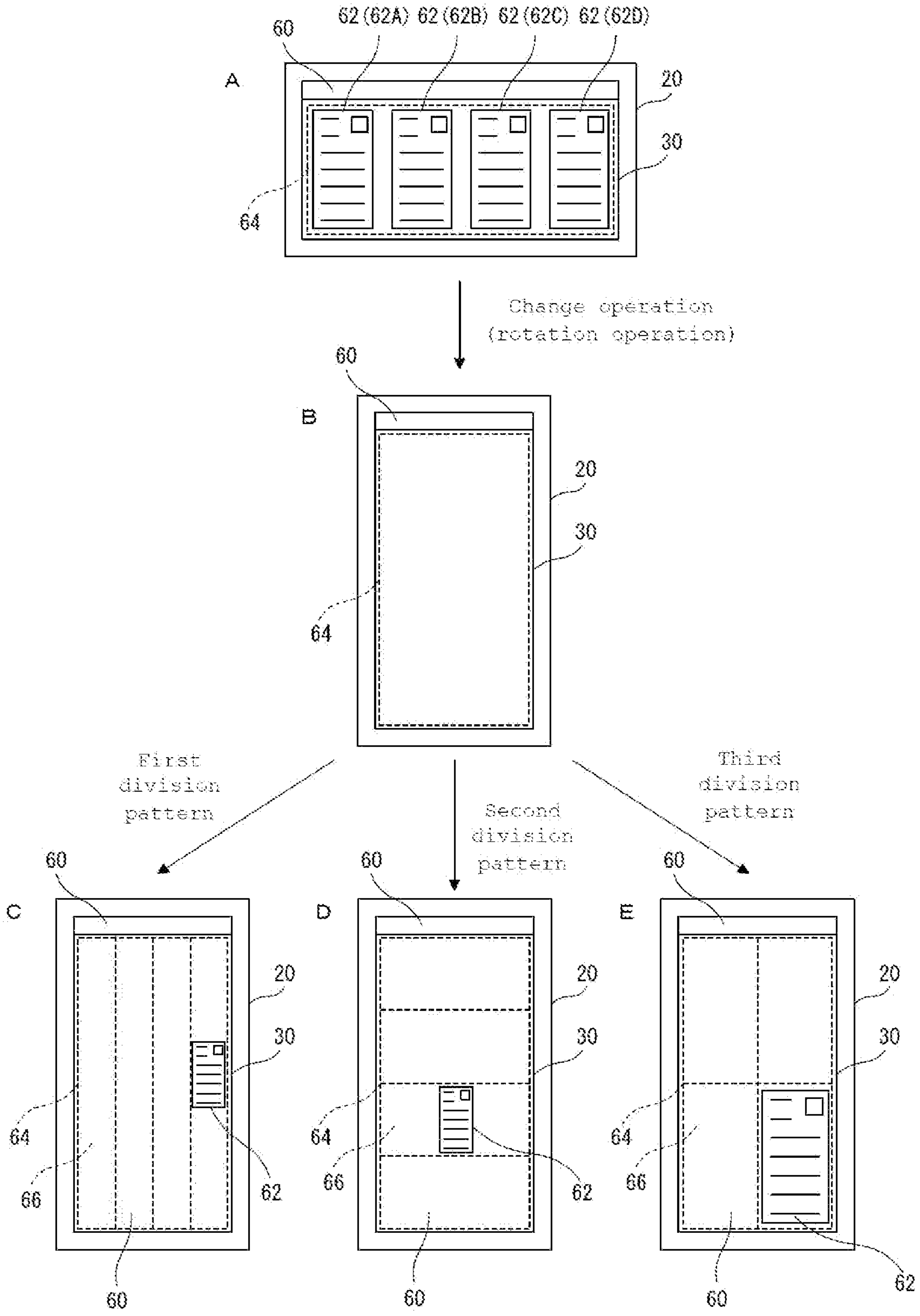
FIG. 3 is a diagram for explaining rearrangement of a display image according to the present embodiment.

FIG. 3 is a diagram for explaining rearrangement of the display image 62 according to the present embodiment. Note that the information processing apparatus 20 in FIG. 3 is an apparatus capable of receiving the rotation operation. Further, in FIG. 3, illustration of the display image 62 is omitted as appropriate.

In the present embodiment, when the change operation (rotation operation) is received by the operation receiving unit 32 and size of the management screen 60 is changed, rearrangement processing is executed. The rearrangement processing may be processing of rearranging the display image 62 displayed as large as possible in a state where an aspect ratio is maintained.

When the rearrangement processing is executed, a display area 64 of the management screen 60 is equally divided into portions as many as the display images 62. In an example illustrated in FIG. 3 at A, there are four of the display images 62, and, for this reason, when the change operation (rotation operation) is performed as illustrated in FIG. 3 at B, the display area 64 is equally divided into four. As a pattern for dividing the display area 64 into a plurality of divided areas 66, a first division pattern (FIG. 3 at C), a second division pattern (FIG. 3 at D), and a third division pattern (FIG. 3 at E) below can be considered.

In the first division pattern, the display area 64 is divided along one direction. In an example illustrated in FIG. 3 at C, the display area 64 is divided such that a plurality of the divided areas 66 are arranged in a lateral direction of the management screen 60.

In the second division pattern, the display area 64 is divided along one direction different from that of the first division pattern. In an example illustrated in FIG. 3 at D, the display area 64 is divided such that a plurality of the divided areas 66 are arranged in a longitudinal direction of the management screen 60.

In the third division pattern, the display area 64 is divided along two directions. In an example illustrated in FIG. 3 at E, the display area 64 is divided such that a plurality of the divided areas 66 are arranged in a matrix in the longitudinal direction and the lateral direction of the management screen 60.

In order to display areas as large as possible while maintaining an aspect ratio of the display area 64, an aspect ratio of the divided areas 66, which is the display area 64 after division, is preferably close to an aspect ratio of the display image 62. For this reason, an aspect ratio of the divided area 66 is most preferably the same as an aspect ratio of the display image 62.

In the examples illustrated in FIG. 3, when the display area 64 is divided along the third division pattern (FIG. 3 at E), the display image 62 in a state where an aspect ratio is maintained can be displayed large. For this reason, in the present embodiment, when the rearrangement processing is executed, the display images 62 are rearranged in a matrix as illustrated in FIG. 3 at E.

Note that, in a case where the number of the display images 62 is an odd number, the number of the display images 62 is treated to be increased by one in the third division pattern.

Figure 4:
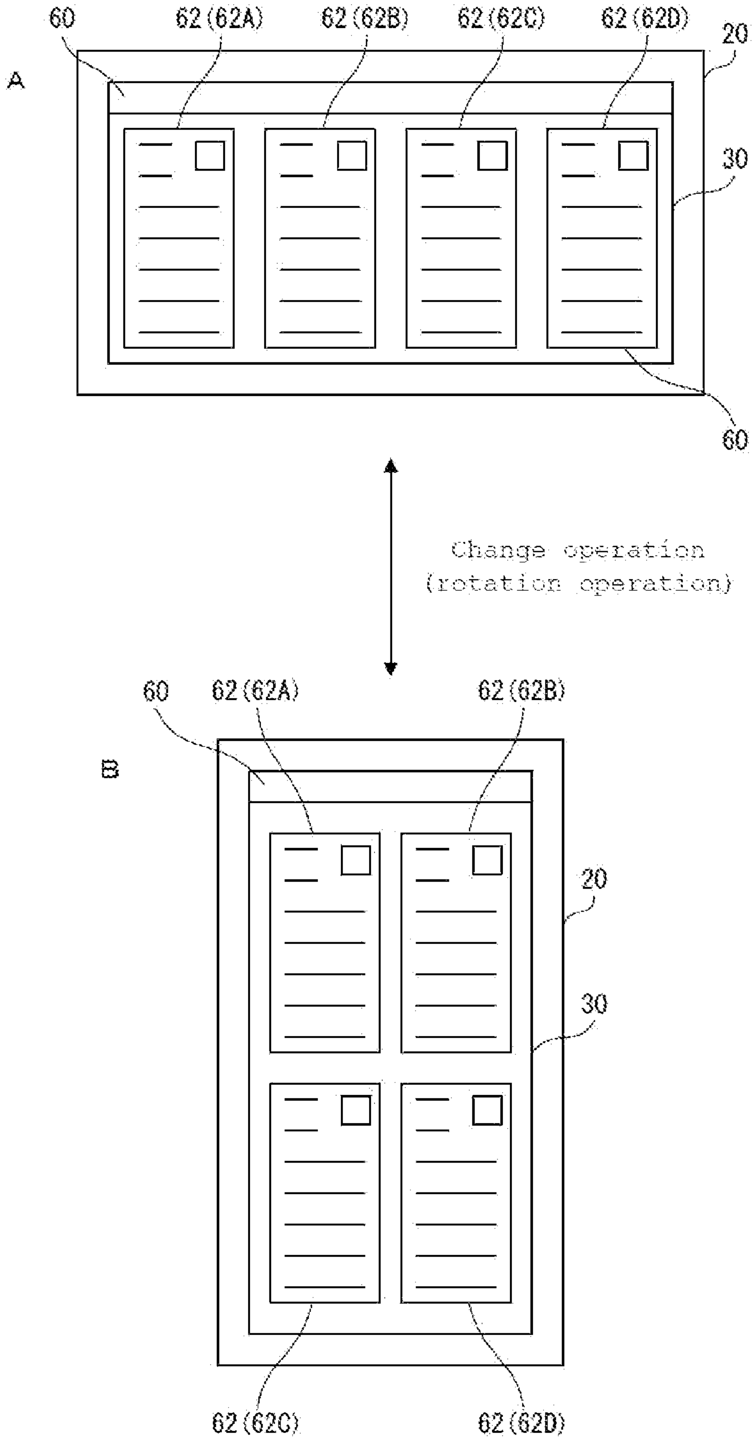
FIG. 4 is a diagram illustrating a first example of rearrangement of a display image according to the present embodiment.

FIG. 4 is a diagram illustrating a first example of rearrangement of the display image 62 according to the present embodiment. Note that the information processing apparatus 20 in FIG. 4 is an apparatus capable of receiving the rotation operation. In an example illustrated in FIG. 4, arrangement of the display images 62 (display images 62A to 62D) is switched between a linear shape (FIG. 4 at A) and a matrix shape (FIG. 4 at B), but size of the display images 62 is not changed. However, size of the display images 62 may be changed.

Figure 5:
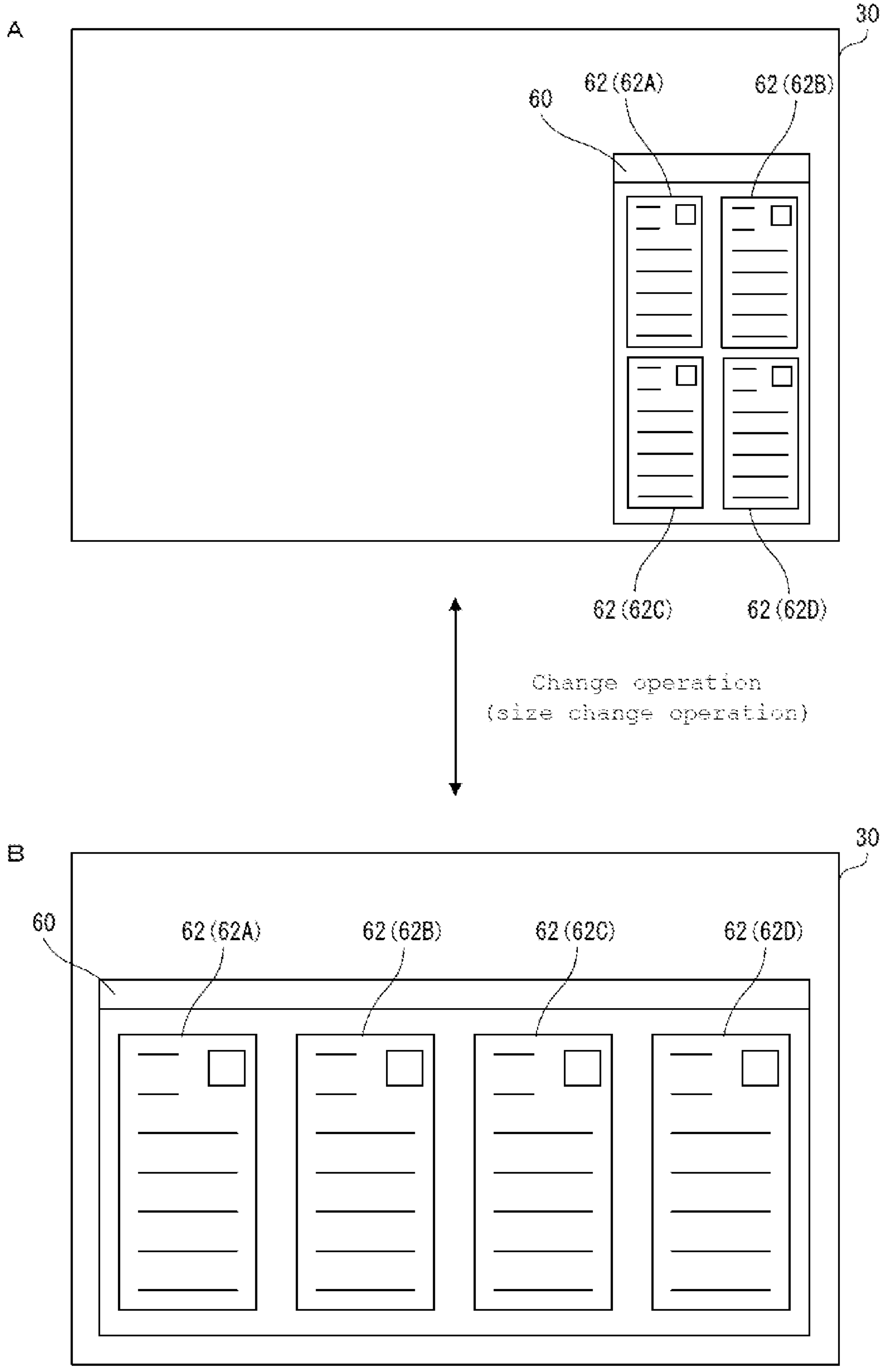
FIG. 5 is a diagram illustrating a second example of rearrangement of a display image according to the present embodiment.

FIG. 5 is a diagram illustrating a second example of rearrangement of the display image 62 according to the present embodiment. Note that the information processing apparatus 20 in FIG. 5 is an apparatus capable of receiving the size change operation. In an example illustrated in FIG. 5, arrangement of the display images 62 (display images 62A to 62D) is switched between a matrix shape (FIG. 5 at A) and a linear shape (FIG. 5 at B), and size of the display images 62 is changed accordingly. However, size of the display images 62 does not need to be changed.

In a conventional information processing apparatus, when size of the display image 62 is less than a predetermined size due to change in size of the management screen 60, there is a possibility that it is inconvenient to manage a plurality of the chromatograph apparatuses 40.

Specifically, when size of the display image 62 is displayed to be smaller than a predetermined size, it may be difficult to visually recognize the display image 62 and to operate the display image 62.

In view of the above, in the present embodiment, size of the display image 62 is prevented from becoming less than the predetermined size. Hereinafter, a method of the above will be described with reference to FIG. 6.

Figure 6:
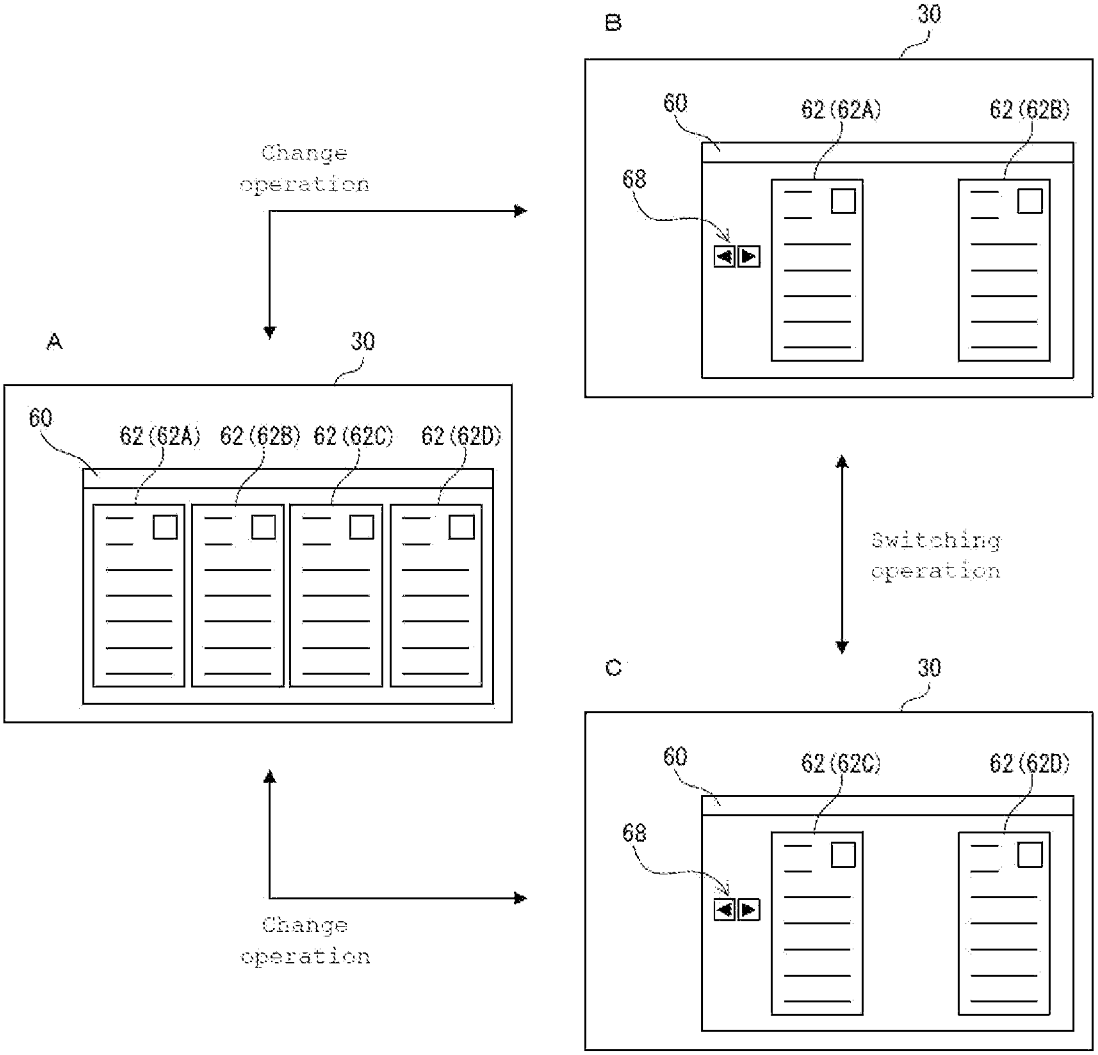
FIG. 6 is a diagram illustrating a third example of rearrangement of a display image according to the present embodiment.

FIG. 6 is a diagram illustrating a third example of rearrangement of the display image 62 according to the present embodiment. Note that the information processing apparatus 20 in FIG. 6 is an apparatus capable of receiving the size change operation. In an example illustrated in FIG. 6, switching is made between a state (FIG. 6 at A) in which all of the display images 62 (display images 62A to 62D) are displayed and a state (FIG. 6 at B or C) in which a part of the display image 62 is displayed, but size of the display images 62 is not changed. However, size of the display images 62 may be changed.

In the present embodiment, in a case where size of the management screen 60 is less than a predetermined size when the change operation is received by the operation receiving unit 32 in the state of FIG. 6 at A, the display images 62 corresponding to a part of a plurality of the chromatograph apparatuses 40 are rearranged on one of the management screens 60 and displayed on the display unit 30 (FIG. 6 at B or C). The "case where size of the management screen 60 is less than a predetermined size" may be a case where at least one of a vertical width and a horizontal width of the management screen 60 is less than a threshold, or may be a case where a ratio of size of the management screen 60 to size of the display image 62 (at least one of a ratio of a vertical width and a ratio of a horizontal width) is less than a threshold.

In an example illustrated in FIG. 6 at B, since size of the display image 62 becomes less than a predetermined size as size of the management screen 60 is changed, the display images 62A and 62B are rearranged on the management screen 60. Note that, in such a case, as illustrated in FIG. 6 at B, the display images 62C and 62D may be rearranged on the management screen 60 instead of the display images 62A and 62B.

Further, in the present embodiment, in a state where a part of the display images 62 is displayed on the management screen 60 as described above, operation (switching operation) for switching display of the management screen 60 is received by the operation receiving unit 32.

The switching operation is operation for switching display of a screen that has been performed on a tablet terminal, a desktop PC, or the like. The switching operation is, for example, operation of directly switching display of the management screen 60. The operation of directly switching display of the management screen 60 includes swipe operation or the like on the management screen 60.

As illustrated in FIG. 6 at B and C, when a switching key 68 to which a function of switching display of the management screen 60 is allocated is displayed on the management screen 60, operation of selecting the switching key 68 is included in the switching operation. Note that the switching key 68 is a button reproduced by software.

In the present embodiment, as illustrated in FIG. 6 at B and C, when the switching operation is received by the operation receiving unit 32, display of the management screen 60 is switched, so that the display images 62 corresponding to remaining ones of the chromatograph apparatuses 40 are rearranged on the management screen 60 and displayed on the display unit 30. Therefore, in the present embodiment, the rearrangement processing is also executed when the switching operation is received by the operation receiving unit 32.

In an example illustrated in FIG. 6 at A to C, when the switching key 68 is operated in a state where the display images 62A and 62B are arranged on the management screen 60 (FIG. 6 at B), display of the management screen 60 is switched, and the display images 62C and 62D are rearranged on the management screen 60 (FIG. 6 at C). Further, when the switching key 68 is operated in a state where the display images 62C and 62D are arranged on the management screen 60 (FIG. 6 at C), display of the management screen 60 is switched, and the display images 62A and 62B are rearranged on the management screen 60 (FIG. 6 at B).

Note that, in the present embodiment, in a case where size of the management screen 60 is less than a predetermined size when the change operation is received by the operation receiving unit 32, the display image 62 may be rearranged over a plurality of pages of the management screen 60 in advance, and a page to be displayed may be switched each time the switching operation is received by the operation receiving unit 32. In this case, the rearrangement processing is executed for each page in advance.

Further, in the present embodiment, in a case where size of the management screen 60 becomes equal to or more than a predetermined size as size of the management screen 60 is changed in the state of FIG. 6 at B or C, all the display images 62 can be displayed on the management screen 60, and switching of display of the management screen 60 can become troublesome. In this case, as illustrated in FIG. 6 at A, the display images 62 may be displayed as a group on the management screen 60, so that all the display images 62 (display images 62A to 62D) are displayed in a visually recognizable manner while the trouble of switching display of the management screen 60 is omitted.

As described above, in the present embodiment, in a case where size of the management screen 60 becomes equal to or more than a predetermined size as the change operation is received by the operation receiving unit 32, the display images 62 corresponding to a plurality of the chromatograph apparatuses 40 are rearranged on one of the management screen 60 and displayed on the display unit 30. The "case where size of the management screen 60 becomes equal to or more than a predetermined size" may be a case where at least one of a vertical width and a horizontal width of the management screen 60 becomes equal to or more than a threshold, or may be a case where a ratio of size of the management screen 60 to size of the display image 62 (at least one of a ratio of a vertical width and a ratio of a horizontal width) is equal to or more than a threshold. Further, determination as to whether the management screen 60 is "less than a predetermined size" and determination as to whether the management screen 60 is "equal to or more than a predetermined size" may be made using the same threshold or may be made using different thresholds.

Furthermore, in the present embodiment, in a case where the chromatograph apparatus 40 includes the display unit 44, the display image 62 corresponding to the chromatograph apparatus 40 is appropriately displayed on the display unit 44 or the management screen 60.

For this reason, the display image 62 that can be appropriately displayed on the display unit 44 or the management screen 60 may be visually recognized as different images when an aspect ratio is different between the case where the display image 62 is displayed on the display unit 44 and the case where the display image 62 is displayed on the management screen 60. Further, in such a case, operational feeling changes between a case of directly operating the chromatograph apparatus 40 and a case of operating via the information processing apparatus 20.

From the above, in the present embodiment, if at least one chromatograph apparatus 40 of a plurality of the chromatograph apparatuses 40 includes the display unit 44, the display image 62 input from the at least one chromatograph apparatus 40 to the information processing apparatus 20 is displayed on the management screen 60.

For example, if all the chromatograph apparatuses 40 include the display unit 44, each of the display images 62 has the same aspect ratio between a case where the display image 62 is displayed on the chromatograph apparatus 40 and a case where the display image 62 is displayed on the information processing apparatus 20.

Note that, in a case where there is the chromatograph apparatus 40 that does not include the display unit 44, an aspect ratio of the display image 62 generated by the chromatograph apparatus 40 that does not include the display unit 44 may be made the same as an aspect ratio of the display image 62 generated by the chromatograph apparatus 40 that includes the display unit 44 by sharing of information on the aspect ratio (aspect ratio information).

In a case where the aspect ratio information is shared by a plurality of the chromatograph apparatuses 40, for example, the aspect ratio information may be input from the chromatograph apparatus 40 including the display unit 44 to the information processing apparatus 20, and the aspect ratio information may be output from the information processing apparatus 20 to the chromatograph apparatus 40 not including the display unit 44.

Figure 7:
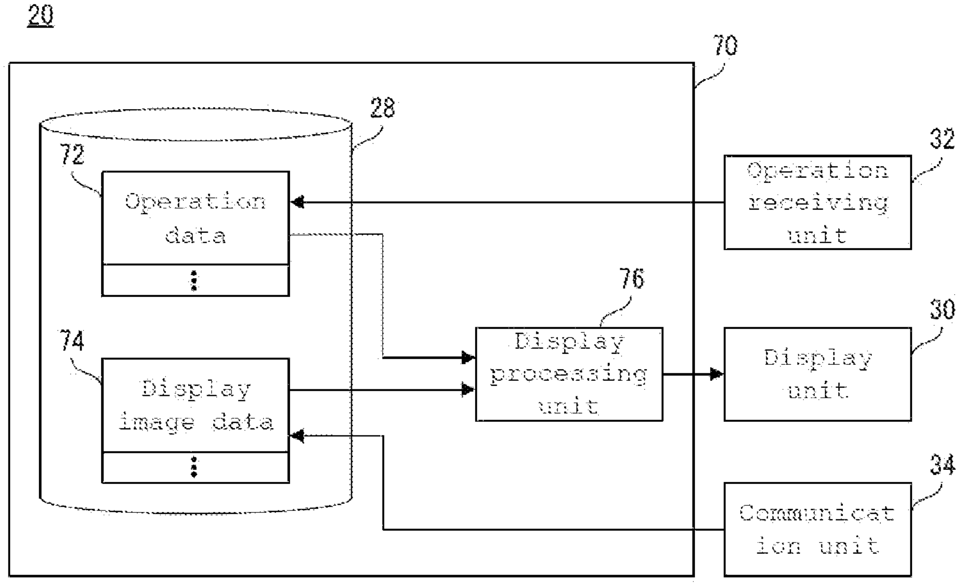
FIG. 7 is a functional block diagram illustrating a specific example of an electrical configuration of an information processing apparatus according to the present embodiment.

4. Specific Example of Electrical Configuration of Information Processing Apparatus FIG. 7 is a functional block diagram illustrating a specific example of an electrical configuration of the information processing apparatus 20 according to the present embodiment. Note that, in FIG. 7, illustration of the RAM 26 and the like is omitted.

The storage unit 28 stores operation data 72, display image data 74, and the like. The operation data 72 is data representing content of operation received by the operation receiving unit 32. The display image data 74 is data corresponding to the display image 62.

Note that a plurality of pieces of the operation data 72 and a plurality of pieces of the display image data 74 may be stored in the storage unit 28. Further, although not illustrated, the control program, the execution data, and the like are also stored in the storage unit 28 as described above.

A control unit 70 functions as a display processing unit 76 when the CPU 24 (see FIG. 1) executes the control program.

When the change operation is received by the operation receiving unit 32, that is, when there is the operation data 72 corresponding to the change operation, the display processing unit 76 uses the display image data 74 to display, on the display unit 30, the management screen 60 in which the display image 62 is rearranged in a state where an aspect ratio is maintained (see FIG. 4 at A and B and FIG. 6 at A to C.

Further, when the change operation is received by the operation receiving unit 32 and the management screen 60 is smaller than a predetermined size, the display processing unit 76 rearranges the display image 62 corresponding to a part of the chromatograph apparatuses 40 among a plurality of the chromatograph apparatuses 40 on one of the management screens 60 and displays the rearranged display image 62 on the display unit 30, and when the switching operation is received by the operation receiving unit 32, the display processing unit 76 switches display of the management screen 60 to rearrange the display image 62 corresponding to a remaining one of the chromatograph apparatuses 40 on the management screen 60 and displays the rearranged display image 62 on the display unit 30 (see FIG. 6 at B and C).

Furthermore, in a case where the management screen 60 has a predetermined size or more when the change operation is received by the operation receiving unit 32, the display processing unit 76 rearranges the display images 62 corresponding to a plurality of the chromatograph apparatuses 40 on one of the management screens 60 and displays the rearranged display images 62 on the display unit 30 (see FIG. 6 at A).

Furthermore, if at least one chromatograph apparatus 40 of a plurality of the chromatograph apparatuses 40 includes the display unit 44 on which the display image 62 is displayed, the display processing unit 76 displays the management screen 60 on the display unit 30 using the display image 62 input from the chromatograph apparatus 40 including the display unit 44. However, communication between the chromatograph apparatus 40 and the information processing apparatus 20 may be transmission and reception of information that enables reconstruction of the same image without transmission and reception of "image data" itself. For example, compressed data, information on a parameter displayed on a screen, and the like may be transmitted and received.

5. Process

Figure 8:
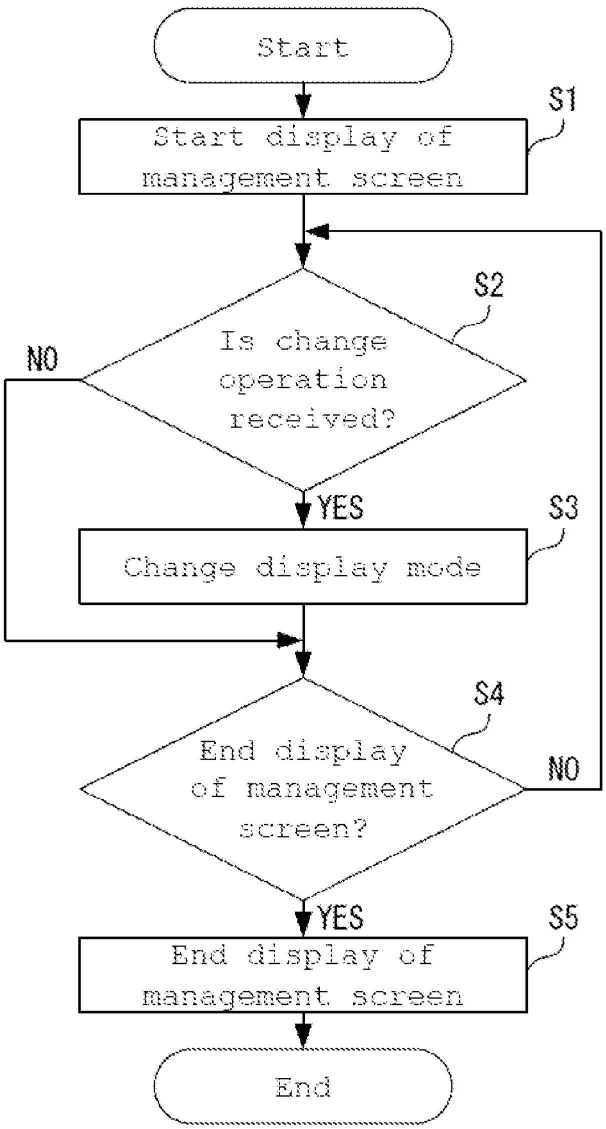
FIG. 8 is a flowchart illustrating an example of screen display processing of the information processing apparatus according to the present embodiment.

FIG. 8 is a flowchart illustrating an example of screen display processing of the information processing apparatus 20 according to the present embodiment. The screen display processing is started, for example, when a predetermined application is executed.

In step S1, display of the management screen 60 on the display unit 30 is started. A display image for each of a plurality of the chromatograph apparatuses 40 is arranged on the management screen 60. In step S2, whether or not the change operation is received is determined.

If "NO" in step S2, that is, if the change operation is not received, the processing proceeds to step S4. On the other hand, if "YES" in step S2, that is, if the change operation is received, the processing proceeds to step S3.

In step S3, a display mode of the management screen 60 is changed. Specifically, in step S3, the display image 62 on the management screen 60 is rearranged in a state where an aspect ratio is maintained.

In step S4, whether or not to end display of the management screen 60 is determined. If "NO" in step S4, that is, if the display of the management screen 60 is not ended, the processing returns to step S2. On the other hand, if "YES" in step S4, that is, if the display of the management screen 60 is ended, the display of the management screen 60 is ended in step S5, and the screen display processing is ended. The determination as to whether or not to end display of the management screen 60 (step S4) may be made on the basis of whether or not operation to end the application is performed.

Figure 9:
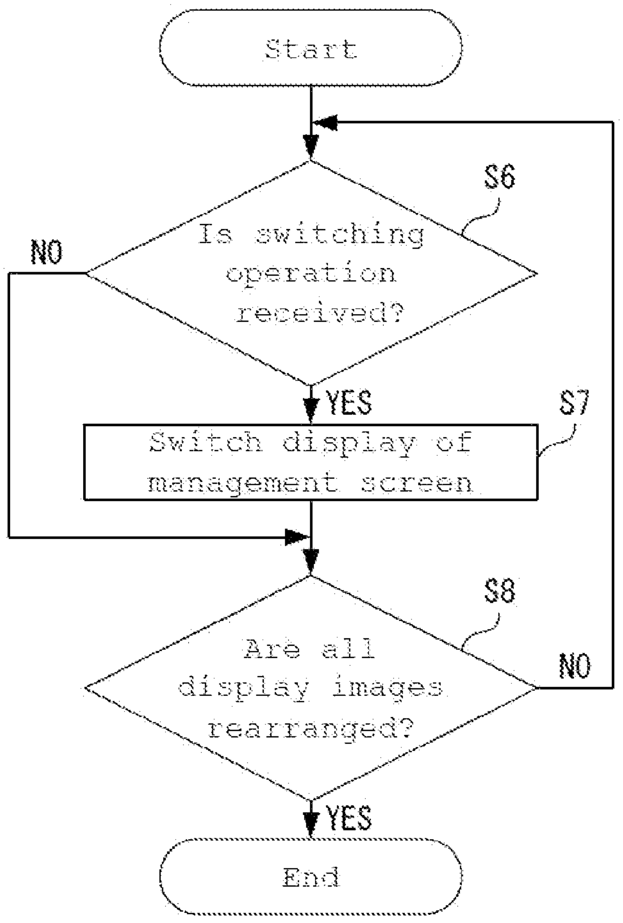
FIG. 9 is a flowchart illustrating an example of display switching processing of the information processing apparatus according to the present embodiment.

FIG. 9 is a flowchart illustrating an example of display switching processing of the information processing apparatus 20 according to the present embodiment. The display switching processing as illustrated in FIG. 6 at B and C is started, for example, when a part of the display images 62 is rearranged on one of the management screen 60 and displayed on the display unit 30.

In step S6, whether or not the switching operation is received is determined. If "NO" in step S6, that is, if the switching operation is not received, the processing proceeds to step S8. On the other hand, if "YES" in step S6, that is, if the switching operation is received, the processing proceeds to step S7.

In step S7, display of the management screen 60 is switched. Specifically, in step S7, the display image 62 corresponding to a remaining one of the chromatograph apparatuses 40, that is, the display image 62 not arranged on the management screen 60 is rearranged on the management screen 60 and displayed on the display unit 30.

In step S8, whether or not all the display images 62 are rearranged according to a change in size of the management screen 60 is determined. If "NO" in step S8, that is, if all the display images 62 are not rearranged, the processing returns to step S6. On the other hand, if "YES" in step S6, that is, if all the display images 62 are rearranged according to the change in size of the management screen 60, the display switching processing is ended.

Note that the specific configuration described in the present embodiment is an example, and can be appropriately changed according to an actual product. Furthermore, in each step of the flowchart illustrated in the present embodiment, the order of processing can be appropriately changed as long as the same result is obtained.

6. Aspect

It is understood by those skilled in the art that the exemplary embodiment described above is a specific example of an aspect below.

(Clause 1) An information processing apparatus according to an aspect is

- an information processing apparatus capable of communicating with a plurality of chromatograph apparatuses, the information processing apparatus including:
- a first display unit;
- a display processing unit that causes the first display unit to display a management screen in which a display image for each of the chromatograph apparatuses related to at least one of an analysis result in a plurality of the chromatograph apparatuses and operation on a plurality of the chromatograph apparatuses is arranged at a common aspect ratio; and
- an operation receiving unit that receives change operation for changing a display mode of the management screen.

The display processing unit may cause the first display unit to display the management screen in which the display image is rearranged in a state where the aspect ratio is maintained when the change operation is received by the operation receiving unit.

According to the information processing apparatus described in Clause 1, the display image for each of a plurality of the chromatograph apparatuses is displayed on the management screen at a common aspect ratio, and if a display mode of the management screen is changed, the display image can be rearranged in a state where the aspect ratio is maintained. Further, in such a case, a change in operational feeling with respect to the display image, erroneous visual recognition of the display image, or the like is prevented as a display mode of the management screen is changed, and thus, it is possible to prevent lowering in convenience in management of a plurality of the chromatograph apparatuses.

(Clause 2) In the information processing apparatus according to Clause 1,

- the change operation may include operation of rotating the information processing apparatus.

According to the information processing apparatus described in Clause 2, also when the display mode of the management screen is changed as the information processing apparatus is rotated, the display image can be rearranged in a state where an aspect ratio is maintained. Further, in such a case, it is possible to prevent convenience at the time of managing a plurality of the chromatograph apparatuses from lowering as the information processing apparatus is rotated.

(Clause 3) In the information processing apparatus according to Clause 1,

- the change operation may include operation of changing size of the management screen.

According to the information processing apparatus described in Clause 3, also when the display mode of the management screen is changed as size of the management screen is changed, the display image can be rearranged in a state where an aspect ratio is maintained. Further, in such a case, it is possible to prevent convenience at the time of managing a plurality of the chromatograph apparatuses from lowering as size of the management screen is changed.

(Clause 4) In the information processing apparatus according to Clause 3,

- the display processing unit may rearrange the display images corresponding to a plurality of the chromatograph apparatuses on one of the management screen and cause the first display unit to display the rearranged display images in a case where the management screen has a predetermined size or more when the change operation is received by the operation receiving unit.

According to the information processing apparatus described in Clause 4, in a case where size of the management screen is equal to or more than the predetermined size, the display image can be rearranged on the management screen. Further, in such a case, the management screen on which all the display images can be visually recognized can be displayed on the first display unit.

(Clause 5) In the information processing apparatus according to Clause 3, the display processing unit may rearrange the display image corresponding to a part of a plurality of the chromatograph apparatuses on one of the management screen and cause the first display unit to display the rearranged display image in a case where the management screen is smaller than a predetermined size when the change operation is received by the operation receiving unit, and switch display of the management screen to rearrange the display image corresponding to a remaining one of the chromatograph apparatuses on the management screen and cause the first display unit to display the rearranged display image when switching operation is received by the operation receiving unit.

According to the information processing apparatus described in Clause 5, it is possible to prevent visual recognition of the display image and operation on the display image from becoming difficult due to size of the display image becoming smaller than the predetermined size.

(Clause 6) In the information processing apparatus according to Clause 1, at least one chromatograph apparatus of a plurality of the chromatograph apparatuses may include a second display unit on which the display image is displayed, and the display processing unit may cause the first display unit to display the management screen by using information input from the at least one chromatograph apparatus.

According to the information processing apparatus described in Clause 6, an aspect ratio of the display image can be made common between a case where the display image is displayed on the second display unit of the chromatograph apparatus and a case where the display image is displayed on the first display unit of the information processing apparatus. Further, in such a case, it is possible to prevent the display image from being visually recognized as different display images between a case where the display image is displayed on the second display unit of the chromatograph apparatus and a case where the display image is displayed on the first display unit of the information processing apparatus. Furthermore, in such a case, it is possible to prevent operational feeling from changing between a case of direct operation of the chromatograph apparatus 40 and a case of operation via the information processing apparatus 20.

What is claimed is:

1. An information processing apparatus for communicating with a plurality of chromatograph apparatuses, the information processing apparatus comprising:

a first display unit;

a display processing unit that causes the first display unit to display a management screen in which an interface comprising a chromatograph analysis result or operation for each of the chromatograph apparatuses is displayed in a separate area, from among a plurality of divided areas, of the management screen, wherein each chromatograph analysis result or operation is arranged at a same aspect ratio in accordance with the plurality of divided areas, and wherein each interface is configured to receive operations for controlling a corresponding chromatograph apparatus; and an operation receiving unit that receives change operation for changing a display mode of the management screen, wherein the plurality of divided areas are displayed in accordance with an array pattern from among a plurality of array patterns, the plurality of array patterns comprising:

(i) a one-dimensional division pattern in which the plurality of divided areas are partitioned only in either a vertical direction or a horizontal direction, and (ii) a two-dimensional division pattern in which the plurality of divided areas are partitioned in both the vertical direction and the horizontal direction, and wherein the first display unit is configured to switch between displaying each chromatograph analysis result or operation in the one-dimensional pattern and the two-dimensional division pattern based on the change operation being received by the operation receiving unit, and wherein the display processing unit causes the first display unit to display the management screen with the plurality of divided areas such that the same aspect ratio is maintained in both the one-dimensional pattern and the two-dimensional pattern.

2. The information processing apparatus according to claim 1, wherein the change operation includes operation of rotating the information processing apparatus.

3. The information processing apparatus according to claim 1, wherein the change operation includes operation of changing size of the management screen.

4. The information processing apparatus according to claim 3, wherein the display processing unit rearranges the display images corresponding to the plurality of chromatograph apparatuses on one of the management screen and causes the first display unit to display the rearranged display images in a case where the management screen has a predetermined size or more when the change operation is received by the operation receiving unit.

5. The information processing apparatus according to claim 3, wherein the display processing unit rearranges the display image corresponding to a part of the plurality of chromatograph apparatuses on one of the management screen and causes the first display unit to display the rearranged display image in a case where the management screen is smaller than a predetermined size when the change operation is received by the operation receiving unit, and switches display of the management screen to rearrange the display image corresponding to a remaining one of the chromatograph apparatuses on the management screen and cause the first display unit to display the rearranged display image when switching operation is received by the operation receiving unit.

6. The information processing apparatus according to claim 1, wherein at least one chromatograph apparatus of the plurality of chromatograph apparatuses includes a second display unit on which the display image is displayed, and the display processing unit causes the first display unit to display the management screen by using information input from the at least one chromatograph apparatus.

7. The information processing apparatus according to claim 5, wherein the management screen comprises a switching key displayed as a button, and wherein the switching key, when operated, causes the information processing apparatus to switch the display of the management screen to rearrange the display image corresponding to the remaining one of the chromatograph apparatuses on the management screen and cause the first display unit to display the rearranged display image.

* * * * *